United States Patent
Masuda

(10) Patent No.: US 9,114,757 B2
(45) Date of Patent: Aug. 25, 2015

(54) DRAWER APPARATUS

(71) Applicant: NIHON PLAST CO., LTD., Fujinomiya-shi, Shizuoka (JP)

(72) Inventor: Yasuhisa Masuda, Fuji (JP)

(73) Assignee: NIHON PLAST CO., LTD., Shizuoka (JP)

( * ) Notice: Subject to any disclaimer, the term of this patent is extended or adjusted under 35 U.S.C. 154(b) by 0 days.

(21) Appl. No.: 14/226,464

(22) Filed: Mar. 26, 2014

(65) Prior Publication Data

US 2014/0292016 A1  Oct. 2, 2014

(30) Foreign Application Priority Data

Mar. 27, 2013 (JP) ................................. 2013-066118

(51) Int. Cl.
*B60R 7/06* (2006.01)
*B60N 3/10* (2006.01)

(52) U.S. Cl.
CPC ... *B60R 7/06* (2013.01); *B60N 3/10* (2013.01); *B60N 3/106* (2013.01)

(58) Field of Classification Search
CPC ............. B60R 7/06; B60N 3/10; B60N 3/106
USPC ................ 296/37.8, 37.12, 70; 220/264, 830;
16/289; 248/311.2; 180/90; 312/323,
312/319.1, 334.8, 334.16, 334.22, 334.2;
224/282, 281, 539
See application file for complete search history.

(56) References Cited

U.S. PATENT DOCUMENTS

| 2,660,180 A * | 11/1953 | Endicott et al. ............... 131/237 |
| 4,596,416 A * | 6/1986 | Muller ........................ 296/37.12 |
| 5,749,554 A * | 5/1998 | Avila et al. .................. 248/311.2 |
| 6,050,628 A * | 4/2000 | Allison et al. ............. 296/37.12 |
| 2003/0080131 A1* | 5/2003 | Fukuo ............. 220/264 |
| 2003/0155476 A1* | 8/2003 | Nakaya ...................... 248/311.2 |
| 2004/0020935 A1* | 2/2004 | Inari ............................ 220/830 |
| 2004/0041426 A1* | 3/2004 | Lee ........................... 296/37.12 |

FOREIGN PATENT DOCUMENTS

| JP | 7-12182 Y2 | 3/1995 |
| JP | 2003-285681 A | 10/2003 |
| JP | 2005186753 A | 7/2005 |

OTHER PUBLICATIONS

Communication dated Oct. 10, 2014, issued by The Intellectual Property Office of the United Kingdom, in counterpart Application No. GB1405287.2.

* cited by examiner

Primary Examiner — Lori L Lyjak
(74) Attorney, Agent, or Firm — Sughrue Mion, PLLC

(57) ABSTRACT

A drawer apparatus comprises a base member (2) having a base wall (3a) and two side walls (3b) that extend in the same direction from opposed ends of the base wall (3a); a drawer (4); a guide structure (10) by which the drawer (4) is guided to move in the base member (2) between an open position and a storage position; and a coil spring (6, 26) that is compressed between the base wall (3a) of the base member (2) and a rear wall (5a) of the drawer (4) to bias the drawer (4) toward the open position, wherein the coil spring (6, 26) includes continuous circular elements of which diameters gradually change in accordance with a positional change in an axial direction.

13 Claims, 6 Drawing Sheets

DRAWER APPARATUS

BACKGROUND OF THE INVENTION

1. Field of the Invention

The present invention relates in general to drawer apparatuses installed in motor vehicles, and more particularly to the drawer apparatus of a type that is constructed compact in size and equipped with a biasing spring for biasing a drawer toward an open position.

2. Description of the Related Art

Hitherto, various types of drawer apparatus have been proposed and put into practical use particularly in the field of wheeled motor vehicles.

In order to clarify the present invention, two known drawer apparatuses will be briefly described in the following, which are those disclosed in Japanese Laid-open Patent Application (tokkai) 2003-285681 and Japanese Utility Model Publication (jikkouhei) 07-12182 respectively.

In Japanese Laid-open Patent Application (tokkai) 2003-285681, there is shown a drawer apparatus for use in a motor vehicle. The drawer apparatus of this publication generally comprises a base structure having an axially extending holding portion, a drawer axially movable in the holding portion between an open position and a storage position, a coil spring compressed between a bottom wall of the holding portion and a rear wall of the drawer to bias the drawer toward the open position and a lock mechanism that is able to lock the drawer at the open and storage positions.

The coil spring used in this drawer apparatus is arranged coaxial with a direction in which the drawer moves. Thus, when the drawer is moved to the storage position against the force of the coil spring, the coil spring is axially compressed and finally takes a cylindrical shape having its continuously connected circular coil elements closely pressed to one another. Upon this, the coil spring shows a certain axial length, and thus, in the storage position of the drawer, there is inevitably produced a certain wasteful space between the bottom wall of the holding portion and the rear wall of the drawer. Due to such wasteful space, the drawer in the storage position is not effectively received in the holding portion of the base structure, which causes the drawer apparatus to fail to have a compact construction.

In Japanese Utility Model Publication (jikkouhei) 07-12182, there is shown a drawer apparatus for use in a motor vehicle. The drawer apparatus of this publication generally comprises an outer case, a drawer axially movable in the outer case between an open position and a storage position, and a coil spring is compressed between a bottom wall of the outer case and a rear wall of the drawer thereby to bias the drawer toward the open position.

The coil spring used in this drawer apparatus has one arm pivotally connected to the bottom wall of the outer case and another arm pivotally connected to the rear wall of the drawer. That is, a main part (viz., the part including multiple coil elements) of the coil spring is so arranged that an axis of the main part is perpendicular to a direction in which the drawer moves. Thus, when the drawer is moved to the storage position against the force of the coil spring, the two arms of the coil spring are gradually pressed toward each other and finally stopped when the main part of the coil spring is tightly sandwiched between the bottom wall of the outer case and the rear wall of the drawer. That is, due to presence of such main part of the coil spring, the drawer in the storage position is not effectively received in the outer case, which also causes the drawer apparatus to fail to have a compact construction.

It is therefore an object of the present invention to provide a drawer apparatus for a motor vehicle, which is free of the above-mentioned drawbacks.

In accordance with a first aspect of the present invention, s there is provided a drawer apparatus which comprises a base member (2) having a base wall (3a) and two side walls (3b) that extend in the same direction from opposed ends of the base wall (3a); a drawer (4); a guide structure (10) by which the drawer (4) is guided to move in the base member (2) between an open position and a storage position; and a coil spring (6, 26) that is compressed between the base wall (3a) of the base member (2) and a rear wall (5a) of the drawer (4) to bias the drawer (4) toward the open position, wherein the coil spring (6, 26) includes continuous circular elements of which diameters gradually change is in accordance with a positional change in an axial direction.

In accordance with a second aspect of the present invention, there is provided a drawer apparatus which comprises a base member (2) having a base wall (3a) and two side walls (3b) that extend in the same direction from opposed ends of the base wall (3a); a drawer (4) having a rear wall (5a); a guide structure (10) by which the drawer (4) is guided to move in the base member (2) between an open position and a storage position; and a coil spring (6, 26) compressed between the base wall (3a) of the base member (2) and the rear wall (5a) of the drawer (4) to bias the drawer (4) toward the open position, wherein the coil spring (6, 26) includes continuous circular elements of which diameter gradually change in accordance with a positional change in an axial direction; and the coil spring (6, 26) is of a type that can take a flat circular shape to be neatly received in a space between the base wall (3a) of the base ember (2) and the rear wall (5a) of the drawer (4) when compressed in an axial direction.

BRIEF DESCRIPTION OF THE DRAWINGS

Other objects and advantages of the present invention will become apparent from the following description when taken in conjunction of the accompanying drawings, in which.

DETAILED DESCRIPTION OF THE INVENTION

In the following, a drawer apparatus of the present invention will be described with reference to the accompanying drawings.

For ease of understanding, in the following explanation, various directional terms, such as, right, left, upper, lower, leftward and the like are used. However, it is to be noted that such terms are to be understood with respect to only a drawing s or drawings on which a corresponding member or portion is shown.

Figure 1:
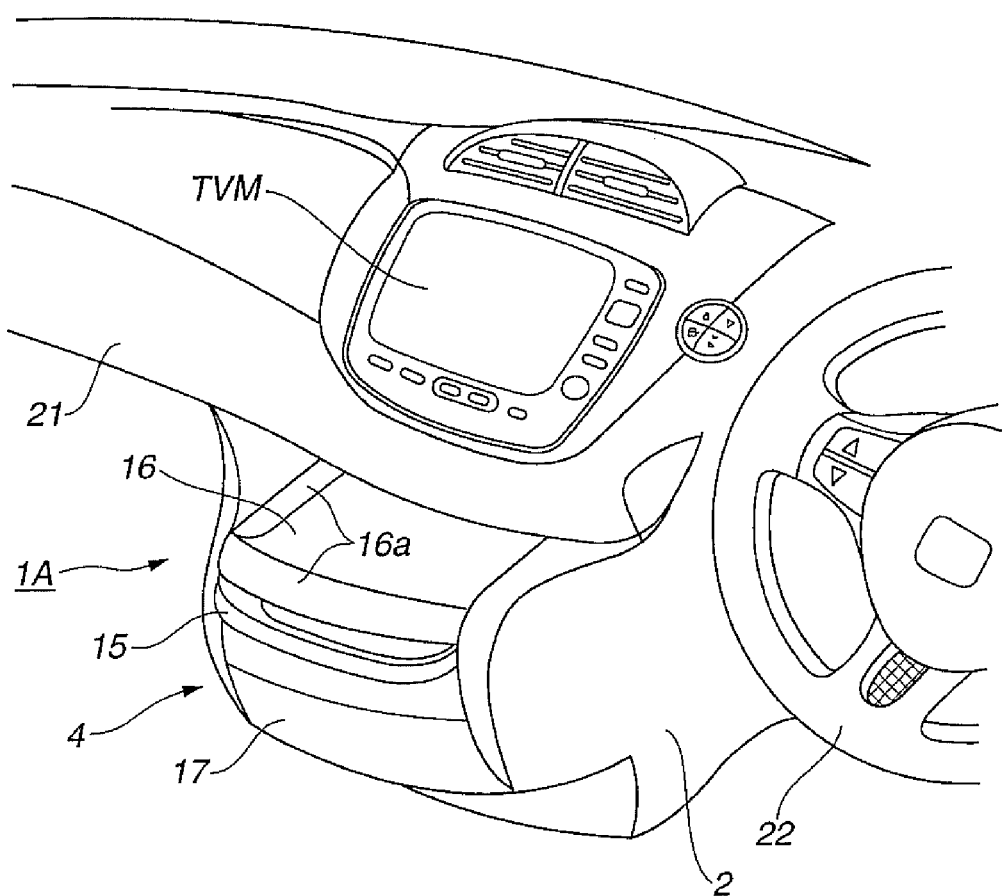
FIG. 1 is a perspective view of a drawer apparatus of the present invention that is practically installed to an instrument panel of a motor vehicle.

Referring to FIG. 1, there is shown a drawer apparatus 1A of a first embodiment of the present invention which is practically installed in an instrument panel 21 of a motor vehicle. As shown in the drawing, the drawer apparatus 1A is mounted just below a TV monitor TVM mounted on a center portion of an upper panel member of the instrument panel. Denoted by numeral 22 is a steering wheel that is placed at a right side of the TV monitor TVM.

Figure 2:
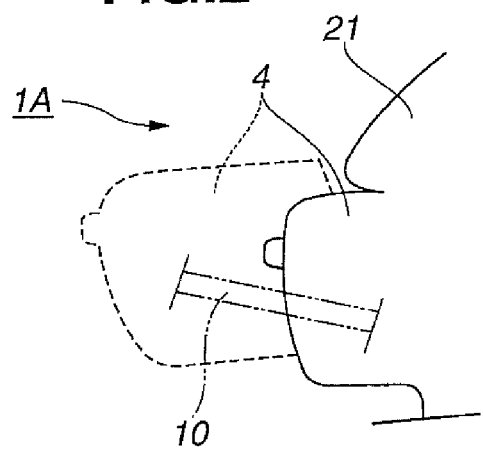
FIG. 2 is a schematic view of the drawer apparatus of the present invention showing two distinguishable positions of a drawer, one (viz., left one) being an open position and the other (viz., right one) being a storage position.

As is seen from FIG. 2, the drawer apparatus 1A has a box-like drawer 4 that can be drawn out to an open position shown by a broken line and drawn into a storage position shown by a solid line. Denoted by numeral 10 is guide means through which the drawer 4 is smoothly movable between the open and storage positions, as will be described in detail hereinafter.

Referring back to FIG. 1, the drawer 4 is movably held between side walls 3b and 3b (see FIG. 3) of a base member 2 that is fixed to the instrument panel 21. Denoted by numeral 16 is a tray provided on the drawer 4, and denoted by numeral 15 is a grip fixed to the drawer 4 just below the tray 16. The tray 16 has side banks 16a raised. Denoted by numeral 17 is a cup holder that is drawable from and retractable into the drawer 4, as will be understood from FIG. 3. A heart-cam mechanism is employed for locking and unlocking the cup holder 17.

Figure 3:
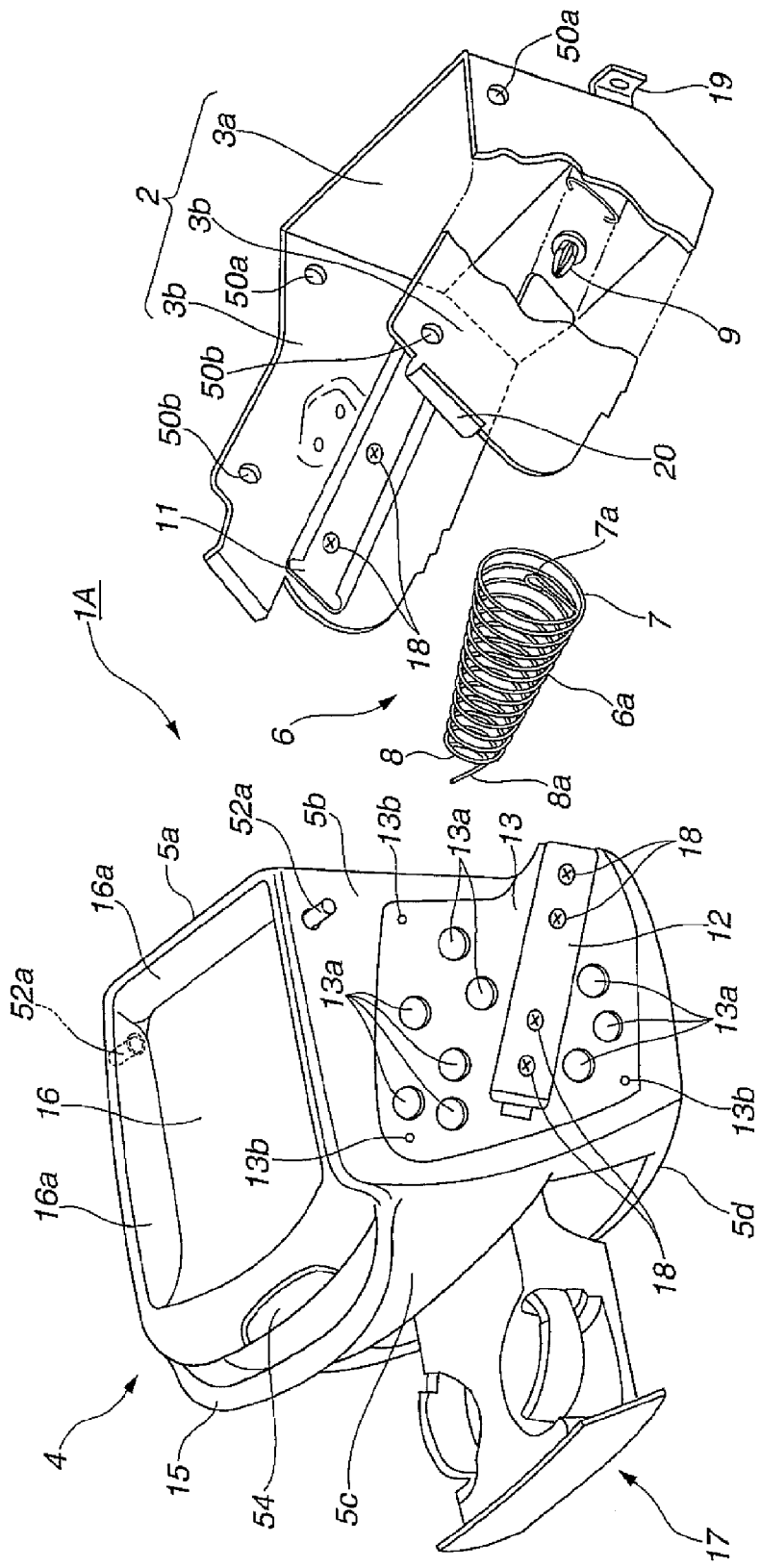
FIG. 3 is an exploded view of the drawer apparatus of a first embodiment of the present invention.

The detail of the drawer apparatus 1A will be much clearly understood from the following description with the aid of FIG. 3.

As is seen from FIG. 3, the drawer apparatus 1A generally comprises three major parts, which are a base member 2 that is fixed to a vehicle body (not shown) through an opening of the instrument panel 21, the above-mentioned box-like drawer 4 that is slidably held by the base member 2 and a cone-shaped coil spring 6 that is practically compressed between the base member 2 for biasing the drawer 4 toward the open position.

As is seen from FIG. 3, the base member 2 is constructed of a steel and generally U-shaped. That is, the base member 2 comprises a rectangular base wall 3a and two side walls 3b and 3b that extend leftward in FIG. 3 from laterally opposed ends of the rectangular base wall 3a.

The rectangular base wall 3a is provided at its outer surface with brackets 19 (only one is shown) through which the base member 2 is fixed to the vehicle body. The rectangular base wall 3a is provided at its inner surface with a coil catching boss 9 is of which function will become apparent as the description proceeds.

The two side walls 3b are provided at inner surfaces thereof with elongate guide members 11 respectively, each elongate guide member 11 being fixed to the side wall 3b through connecting bolts 18. The guide members 11 are constructed of a metal or a so-called engineering plastic. As shown, each guide member 11 comprises an elongate base portion (no numeral) and two elongate side guide walls (no numerals) extending along laterally opposed ends of the elongate base portion. As shown, each elongate side guide wall is curved inward. Furthermore, the two side walls 3b of the base member 2 have outwardly extended flanges 20 at their leading ends respectively.

As is well shown in FIG. 3, the drawer 4 is constructed of a molded resin. That is, for molding the drawer 4 with polypropylene or the like, injection molding or blow molding can be employed. Of course, the drawer 4 may be constructed of a metal.

As is mentioned hereinabove, the drawer 4 has the tray 16 formed thereon, the grip 15 provided on a front upper portion thereof and the cup holder 17 at a lower portion thereof.

As shown, the drawer 4 is in the shape of a rectangular parallelepiped that comprises a front wall 5c, side walls 5b and 5b, a rear wall 5a, an upper wall (no numeral) formed with the tray 16 and a lower wall 5d.

Reinforcing plates 13 of steel are respectively connected via thermal welding or the like to the side walls 5b of the drawer 4. For assuring the connection between the reinforcing plates 13 and the side walls 5b, screws 13b are used each being screwed into the side wall 5b after passing through the reinforcing plate 13. Each reinforcing plate 13 is formed with a plurality of openings 13a for reducing the weight of the plate 13.

Elongate slide members 12 of metal are respectively secured to the reinforcing plates 13 through connecting bolts 18. Upon proper assembly, the slide members 12 are slidably received in the guide members 11 of the base member 2 to allow the drawer 4 to move leftward and rightward in the base member 2 along the guide members 11. Although not shown in the drawing, each slide member 12 has longitudinally extending slits at upper and lower edges for the slidable engagement with the corresponding guide member 11 that has elongate side guide walls.

Thus, the guide members 11 and the slide members 12 constitute the above-mentioned guide means 10.

If desired, the slide members 12 may be constructed of a synthetic resin, such as polyamide-6, polyacetal, fluororesin (tetorafluoroethane), or these resins to which silicone-oil is added. If silicone-oil mixed resin is used for the slide members 12, the slide movement of the slide members 12 relative to the guide members 11 is improved.

Between the base member 2 and the drawer 4, there is compressed the cone-shaped coil spring 6 for biasing the drawer 4 leftward in FIG. 3 in the base member 2.

Figure 4:
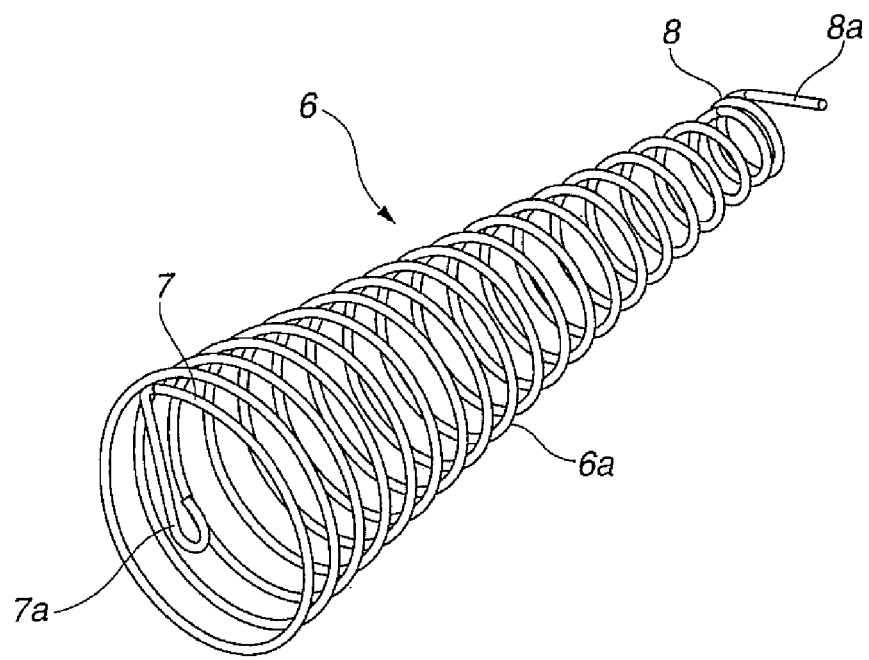
FIG. 4 is a perspective view of a cone-shaped coil spring used in the first embodiment of the present invention.

As is seen from FIG. 4, the cone-shaped coil spring 6 comprises a conical main part 6a, a larger diameter end part 7 and a smaller diameter end part 8. The larger diameter end part 7 is formed with an engaging end 7a that extends radially inward, and the smaller diameter end part 8 is formed with an engaging end 7a that extends outward in a tangential direction.

The cone-shaped coil spring 6 is a spiral spring that includes a plurality of continuously connected circular elements of which diameters gradually change in accordance with a positional change in an axial direction of the spring 6.

Figure 5:
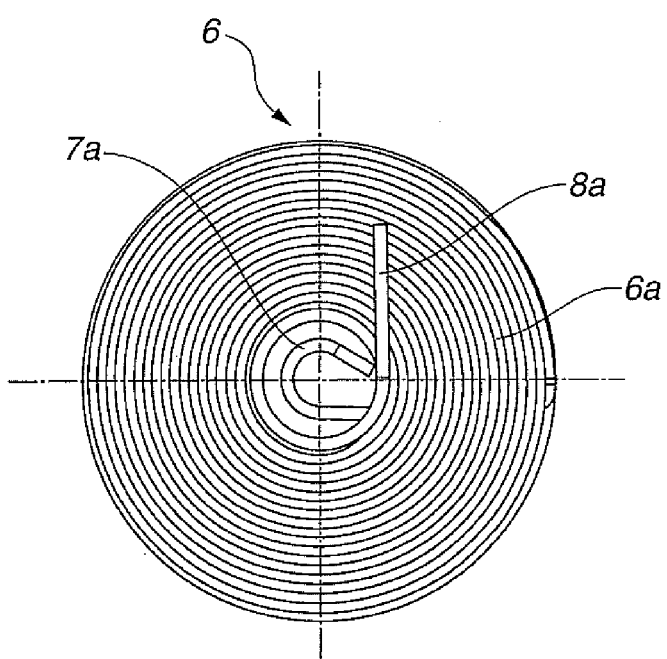
FIG. 5 is a plan view of the cone-shaped coil spring in a fully compressed condition, that is taken from a right position of the spring of FIG. 4.

As will be understood from FIG. 5, when fully compressed, the cone-shaped coil spring 6 takes a flat circular shape having circular coil elements thereof flatly received on a flat surface.

Referring back to FIG. 3, when assembled, the engaging end 7a of the cone-shaped coil spring 6 is caught by the coil catching boss 9 of the base member 2 and the other engaging end 8a of the cone-shape coil spring 6 is pressed against the rear wall 5a of the drawer 4. The other engaging end 8a is shaped to extend in a tangential direction thereby to enlarge a contact area between the end 8a and the rear wall 5a Thus, as will be seen from FIG. 6, the drawer 4 is constantly biased leftward by the cone-shaped coil spring 6.

Figure 7:
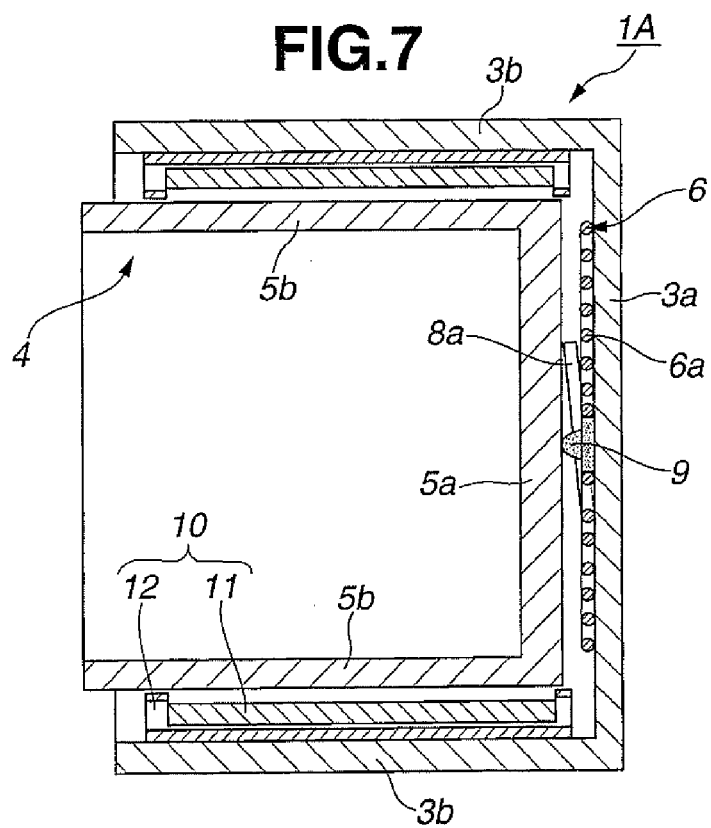
FIG. 7 is an enlarged sectional view of the drawer apparatus of the first embodiment with the drawer assuming the storage position.

While, as will be seen from FIG. 7, when the drawer 4 is fully pushed into the base member 2 against the force of the coil spring 6, the coil spring 6 is forced to take the flat circular shape allowing the drawer 4 to take the deepest position in the base member 2. In this deepest position, the rear wall 5a of the drawer 4 is separated from the rectangular base wall 3a of the base member 2 by a distance that is about twice the diameter of the wire of the coil spring 6.

In order to lock the drawer 4 at the deepest position in the base member 2, a lock mechanism 100 is employed.

As is seen from FIG. 3, the lock mechanism 100 comprises a pair of rear pin openings 50a formed in rear upper portions of the side walls 3b and 3b of the base member 2 and a pair of front pin openings 50b formed in front upper portions of the side walls 3b and 3b.

The lock mechanism 100 further comprises a pair of lock pins 52a that are retractably provided at rear upper portions of the side walls 5b of the drawer 4. These two lock pins 52a and 52a are connected through a control mechanism (not shown) to a control knob 54 retractably held by an upper portion of the front wall 5c of the drawer 4.

The control mechanism comprises a first biasing means that is biases the two lock pins 52a laterally outward, a Y-shaped wire that has two rear ends pivotally connected to inner ends of the lock pins 52a and a front end pivotally connected to the control knob 54, a second biasing means that biases the control knob 54 rearward and a guide means that guides the Y-shaped wire for smoothly transmitting movement of the control knob 54 to the lock pins 52a.

In the following, operation of the drawer apparatus 1A of the first embodiment will be described with the aid of FIGS. 3 to 7.

Figure 6:
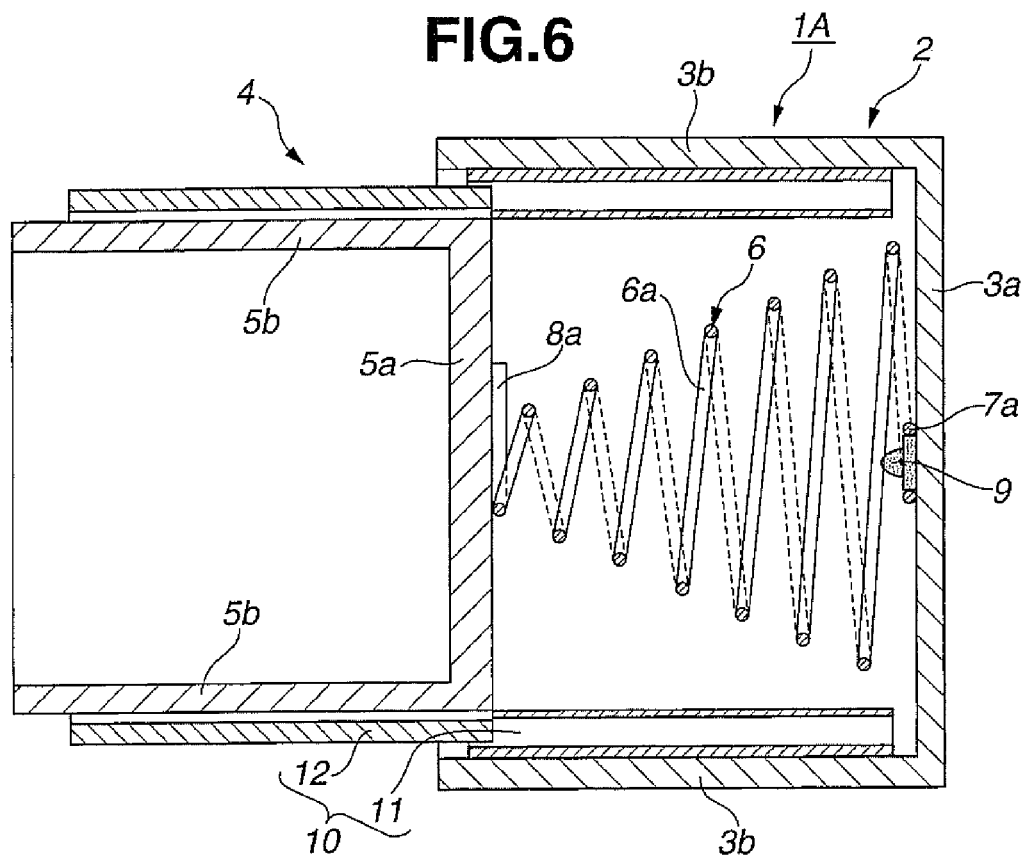
FIG. 6 is an enlarged sectional view of the drawer apparatus of the first embodiment with the drawer assuming the open position.

For ease of explanation, the description will be commenced with respect to the open position of the drawer 4, which is depicted by FIG. 6.

In this open position, the drawer 4 is drawn out sufficiently from the base member 2 and locked to the base member 2 having the lock pins 52a and 52a engaged with the front pin opening 50b and 50b (see FIG. 3) of the base member 2, as is seen from FIG. 6. Under this open position, the cone-shaped coil spring 6 biases the drawer 4 toward the open position with a reduced force, as is understood from the drawing.

When now the control knob 54 is pulled against the force of the second biasing means to release the lock pins 52a and 52a from the front pin openings 50b and 50b and then, with the control knob 54 being kept pulled against the second biasing means, a certain force is applied to the drawer 4 in a rightward direction in FIG. 3 against the biasing force of the cone-shaped coil spring 6, the drawer 4 is moved rightward and finally to the storage position of FIG. 7. Upon arriving at the storage position, the two lock pins 52a and 52a are permitted to engage with the to rear pin openings 50a and 50a of the base member 2 due to the force of the first biasing means and thus the drawer 4 is locked at the storage position. During movement of the drawer 4 from the open position to the storage position, the lock pins 52a and 52a are kept drawn in by the side walls 5b of the base member 2.

Due to the cone-shape of the spring 6, initial movement of the drawer 4 toward the storage position requires only a small force, which brings about a smoothed movement of the drawer 4 throughout entire traveling of the drawer 4 to the storage position.

It is now to be noted that due to the flat circular shape which the cone-shaped coil spring 6 takes when it is fully compressed, the drawer 4 can be deeply received in the base member 2. This brings about a compact construction of the drawer apparatus 1A.

As is seen from FIGS. 5 and 7, when the drawer 4 is in the storage position, the other engaging end 8a of the cone-shaped coil spring 6 is put on the flatly shaped coil spring 6. This prevents the other engaging end 8a from engaging with the engaging end 7a. If such engagement takes place, normal expansion of the cone-shaped coil spring 6 is not expected.

When, with the drawer 4 kept in the storage position, the control knob 54 is pulled against the force of the second biasing means to release the lock pins 52a and 52a from the rear pin openings 50a and 50a and then released, the drawer 4 is moved back toward the open position due to the biasing force of the cone-shaped coil spring 6. When, during the backward movement, the drawer 4 comes to the open position, the lock pins 52a and 52a are permitted to engage with the front pin openings 50b and 50b due to the force of the first biasing means. Thus, the drawer 4 takes the open locked position as shown in FIG. 6.

Figure 8:
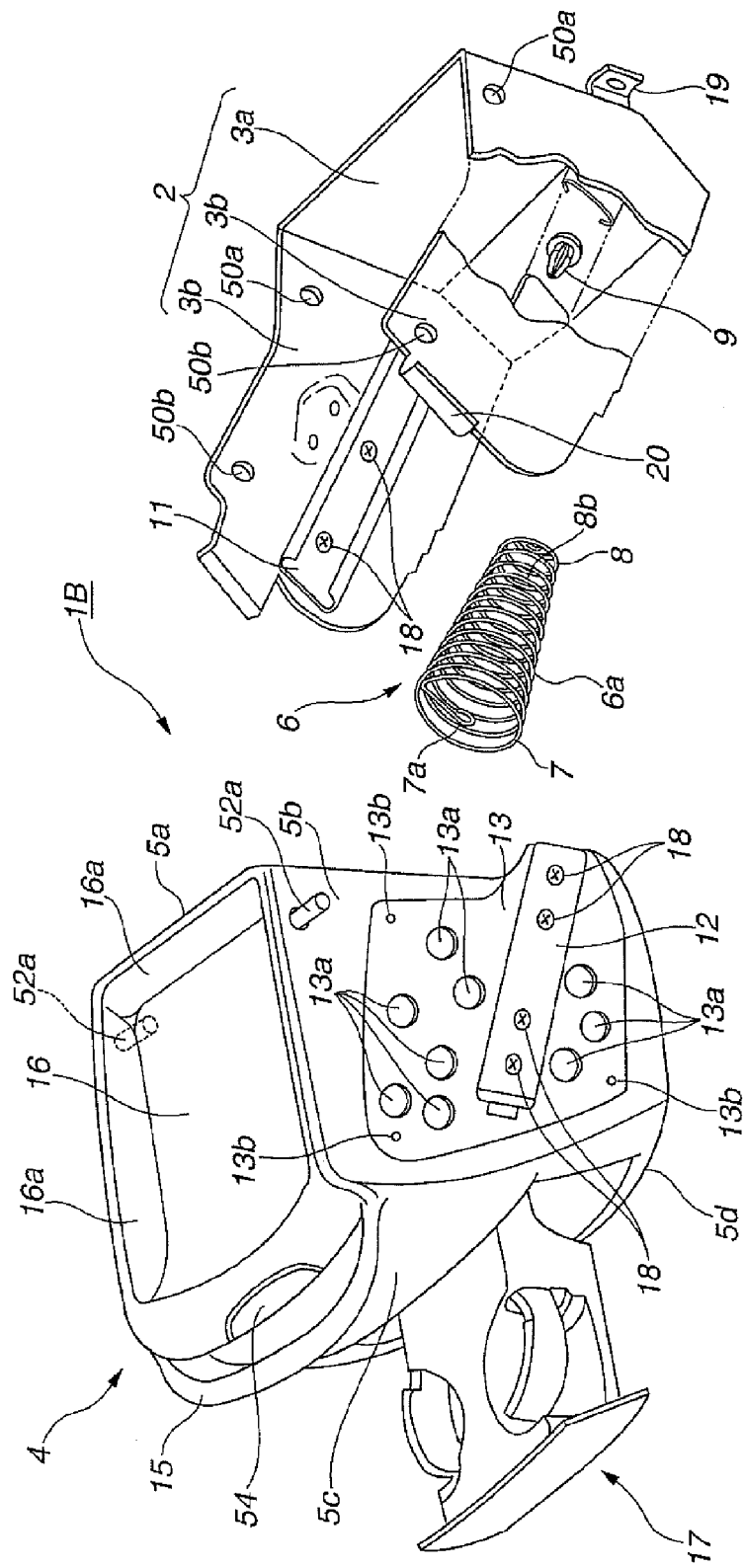
FIG. 8 is a view similar to FIG. 3, but showing a second embodiment of the present invention, in which the cone-shaped coil spring is installed in a reversed manner.

Referring to FIG. 8, there is shown a drawer apparatus 1B of to a second embodiment of the present invention.

Since the drawer apparatus 1B of the second embodiment is very similar to the drawer apparatus 1A of the above-mentioned first embodiment of FIG. 3, only a part that is different from that of the first embodiment will be described in the following.

That is, in the second embodiment, the arrangement of the cone-shaped coil spring 6 to both the base member 2 and drawer 4 is reversed as compared with the first embodiment.

As shown, in the second embodiment, the larger diameter end part 7 with the engaging end 7a is pressed against the rear wall 5a of the drawer 4 and the smaller diameter end part 8 with an engaging end 8b is caught by the coil catching boss 9 of the base member 2.

Operation of the drawer apparatus 1B of the second embodiment is substantially the same as that of the first embodiment, and thus, description of the operation will be omitted.

Figure 9:
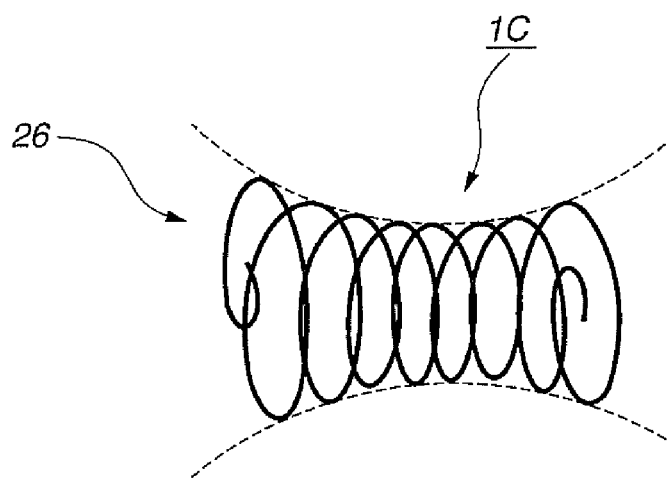
FIG. 9 is a schematic view of a center-reduced coil spring that is used in a third embodiment of the present invention.

Referring to FIG. 9, there is shown a coil spring 26 that is used in a drawer apparatus 1C of a third embodiment of the present invention.

As shown, the coil spring 26 used in this third embodiment 1C is of a center-reduced type that comprises two cone-shaped coil parts that face to each other at their diametrically smaller ends. Also, this type coil spring 26 takes a flat circular shape when fully compressed.

That is, in the third embodiment, the coil spring 26 is compressed between the rectangular base wall 3a of the base s member 2 and the rear wall 5a of the drawer 4. The right end of the coil spring 26 is fixed to the rectangular base wall 3a and the left end of the coil spring 26 is pressed against the rear wall 5a of the drawer 4.

In the following, various modifications and variations of the above-mentioned drawer apparatus 1A, 1B and 1C will be described.

In the above explanation, the drawer apparatus of the invention is described to be mounted to an instrument panel 21 of a motor vehicle. However, if desired, the drawer apparatus is may be mounted to various positions of an interior of the motor vehicle.

As will be understood from FIG. 3, if the slide members 12 are arranged to incline relative to the side walls 5b of the drawer 4, movement of the drawer 4 toward the open position is carried out obliquely upward or downward. If the movement is made obliquely downward, the tray 16 is permitted to hold tall goods.

In place of the center-reduced type coil spring 26 shown in FIG. 9, a drum-shaped coil spring is also usable in the invention.

In the above description, only two types of coil springs 6 and 26 are explained for use in the present invention. However, springs usable in the invention are not limited to such coil springs 6 and 26. That is, springs usable in the invention may be those that become very flattened when fully compressed.

If the drawer 4 is constructed of a molded resin, the slide members 12 may be integrally molded on the drawer 4. In this case, the reinforcing plates 13 are not used.

In FIG. 6, there is shown a condition wherein the engaging end 8a of the cone-shaped coil spring 6 is pressed against the rear wall 5a of the drawer 4 to bias the drawer 4 leftward. However, in the present invention, there is no need of pressing the engaging end 8a against the rear wall 5a of the drawer 4 in the open position. That is, in the open position, the engaging end 8a may be spaced apart from the rear wall 5a. In this case, the natural length of the cone-shaped coil spring 6 is shorter than an actual distance travelled by the drawer 4 from the storage position to the open position.

If desired, the engaging end 8a of the cone-shaped spring 6 to may be connected to the rear wall 5a of the drawer 4. In this case, the drawer 4 locked in the open position is biased toward the storage position. Thus, once the locked condition is released, the drawer 4 is moved toward the storage position but in a small given distance. Thereafter, an operator has to push the drawer 4 toward the storage position for placing the drawer 4 to the storage position.

If desired, two or more springs may be arranged between the base member 2 and the drawer 4. Of course, in this case, these springs should not be arranged to overlap each other. Usage of a plurality of springs may bring about a much smoothed movement of the drawer 4 between the open and storage positions.

The entire contents of Japanese Patent Application 2013-066118 filed Mar. 27, 2013 are incorporated herein by reference.

Although the invention has been described above with reference to embodiments of the invention, the invention is not limited to such embodiments as described above. Various modifications and variations of such embodiments may be carried out by those skilled in the art, in light of the above description.

What is claimed is:

1. A drawer apparatus comprising:
a base member having a base wall and two side walls that extend in the same direction from opposed ends of the base wall;
a drawer;
a guide structure by which the drawer is guided to move in the base member between an open position and a storage position; and
a coil spring that is compressed between the base wall of the base member and a rear wall of the drawer to bias the drawer toward the open position,
wherein the coil spring includes continuous circular elements of which diameters change in accordance with a positional change in an axial direction, and
wherein the coil spring is of a type that takes a flat circular shape to be neatly received in a space between the base wall of the base member and the rear wall of the drawer when compressed in an axial direction.

2. A drawer apparatus as claimed in claim 1, in which the coil spring includes a plurality of continuously connected circular elements of different diameters which are arranged side by side and become closer to one another without being put on one another when compressed in the axial direction.

3. A drawer apparatus as claimed in claim 2, in which the coil spring is a cone-shaped coil spring that includes a plurality of continuously connected circular elements of which diameters gradually increase with an increase of an axial distance.

4. A drawer apparatus as claimed in claim 2, in which the coil spring is of a center-reduced type that includes two cone-shaped coil sections that are integrally connected to each other at their diametrically reduced ends, each cone-shaped coil section including a plurality of continuously connected circular elements of which diameters gradually increase with an increase of an axial distance.

5. A drawer apparatus comprising:
a base member having a base wall and two side walls that extend in the same direction from opposed ends of the base wall;
a drawer;
a guide structure by which the drawer is guided to move in the base member between an open position and a storage position; and
a coil spring that is compressed between the base wall of the base member and a rear wall of the drawer to bias the drawer toward the open position,
wherein the coil spring includes continuous circular elements of which diameters change in accordance with a positional change in an axial direction,
wherein a pair of elongate guide members are connected to the side walls of the base member respectively;
wherein a pair of elongate slide members respectively connected side walls of the drawer, the elongate slide members being slidably received in the elongate guide members to allow the drawer to move in forward and rearward direction in the base member,
wherein the elongate slide members are connected to the side walls of the drawer through respective reinforcing plates, and
wherein the reinforcing plates are constructed of a steel and formed with a plurality of openings.

6. A drawer structure as claimed in claim 1, in which the drawer is provided with a cup holding that is drawable from and retractable into the drawer.

7. A drawer structure as claimed in claim 1, in which one axial end of the coil spring is connected to the base wall of the base member and the other end of the coil spring is in abutment with a rear wall of the drawer.

8. A drawer apparatus as claimed in claim 7, in which the other end of the coil spring is pressed against the rear wall of the drawer when the drawer takes the open position.

9. A drawer apparatus comprising:
a base member having a base wall and two side walls that extend in the same direction from opposed ends of the base wall;
a drawer;
a guide structure by which the drawer is guided to move in the base member between an open position and a storage position; and
a coil spring that is compressed between the base wall of the base member and a rear wall of the drawer to bias the drawer toward the open position,
wherein the coil spring includes continuous circular elements of which diameters gradually change in accordance with a positional change in an axial direction, and
wherein the drawer apparatus further comprises a lock mechanism which comprises:
a pair of rear pin openings formed in the side walls of the base member;
a pair of front pin openings formed in the side walls of the base member at portions other than the rear pin openings;

a pair of lock pins retractably provided at side walls of the drawer;

a control knob retractably held by a front wall of the drawer; and a control mechanism arranged between each of the lock pins and the control knob for transmitting operation of the control knob to the lock pins.

10. A drawer apparatus as claimed in claim 9, in which the control mechanism comprises:

a first biasing means that biases the lock pins laterally outward;

a Y-shaped wire that has two rear ends pivotally connected to inner ends of the lock pins and a front end pivotally connected to the control knob; and a second biasing means that biases the control knob toward the lock pins.

11. A drawer apparatus as claimed in claim 10, in which the control mechanism further comprises a guide means that guides the Y-shaped wire for smoothly transmitting movement of the control knob to the lock pins.

12. A drawer structure as claimed in claim 7, in which a diameter of said one axial end of the coil spring is smaller than a diameter of said other end of the coil spring.

13. A drawer structure as claimed in claim 7, in which a diameter of said one axial end of the coil spring is larger than a diameter of said other end of the coil spring.

\* \* \* \* \*